United States Patent Office 3,319,715
Patented May 16, 1967

3,319,715
POLYSACCHARIDE B-1459 AND Mg(OH)₂ IN BRINES USED IN WELL TREATMENTS
Christ F. Parks, Tulsa, Okla., assignor to The Dow Chemical Company, Midland, Mich., a corporation of Delaware
No Drawing. Filed Feb. 17, 1965, Ser. No. 433,492
15 Claims. (Cl. 166—42)

The invention is an improved composition and an improved method of drilling wells penetrating earth formations and for treating such formations by injecting fluids down a well (to either or both of which reference will often be made herein as well treatment or treating wells).

In a number of circumstances encountered in the treatment of wells, wherein an aqueous liquid is employed, it is conducive to the attainment of best results to employ an aqueous solution, viz. a brine. Such circumstances include those wherein a liquid having a relatively high density and one having particularly good suspending properties for particulate solids are desired.

Such treatments are often conducted in or through formations comprising poorly consolidated strata wherein the liquid being employed, e.g. drilling fluid or fluid employed in reworking, perforating, or fracturing, tends to seep away through the formation at an excessive rate, thereby lessening or even preventing the beneficial results otherwise obtainable by the treatment. Such unwanted seepage is broadly termed fluid loss. Materials employed to lessen fluid loss are often referred to as fluid loss control agents. In brine systems, fluid loss control agents admixed or incorporated therein tend to degenerate during usage or storage, particularly at advanced temperatures, e.g. above 175° F. and particularly at temperatures above about 250° F. Such temperatures often are encountered in drilling or treating deep wells.

To lessen the fluid loss of brines to the formation during treatment, I have discovered that when both polysaccharide B-1459 (hereinafter called B-1459) and $Mg(OH)_2$, are present in a brine system, low fluid loss properties are imparted to the brine system which are retained during use and storage, even at elevated temperatures.

The B-1459 may be employed in an amount between about 0.1 pound and about 5 pounds per 42-gallon barrel of the brine. Less than 0.1 pound per barrel imparts some beneficial effect but it has been found that the use of at least this amount shows consistent and more pronounced benefit. If desired, more than 5 pounds per barrel may be employed with good results, but the use of greater amounts is not economically justified. The nature and manner of preparation of the B-1459 is discussed in detail hereinafter.

The $Mg(OH)_2$ is employed in the practice of the invention in an amount of at least about 10% by weight of the B-1459 employed. The amount of $Mg(OH)_2$ employed is usually at least about 0.5 pound per 42-gallon barrel or at least about 0.0015 part per 100 parts by weight of the treating fluid.

In the practice of the invention, other materials, in a pulverulent state, may be employed to supplement the fluid loss control properties of the B-1459 and $Mg(OH)_2$, among which are starch, natural gums, synthetic polymers of which polyacrylamide is illustrative, and such mineral materials as silica flour, $CaCo_3$, fragmented brick and ceramic materials, and pumice. The supplemental material may be employed in an amount up to 1.5 times the weight of B-1459 employed, i.e. the B-1459 present must be employed in an amount of at least about two-thirds of the weight of such supplemental fluid loss control agent present.

The brine may be any natural or synthetic aqueous salt solution. For practical purposes, an aqueous solution of an inorganic salt or mixture of salts does not shown significant brine characteristics until the concentration of the dissolved salt therein is sufficient to result in a specific gravity of at least about 1.005. Accordingly the amount of inorganic salt present in the composition of the invention may be defined as that which will result in a specific gravity of at least about 1.005 when admixed with the amount of water employed. The inorganic salts present may be any water-soluble halide, carbonate, phosphate, sulfate, or the like of a metal or ammonium, or mixtures thereof which are sufficiently soluble in water to yield the stated specific gravity, principle among which are ammonium and alkali and alkali metal chlorides, e.g. $NaCl$, $KCl$, $NH_4Cl$, $CsCl$, $BaCl_2$, $MgCl_2$, $CaCl_2$, and $SrCl_2$. Other salts encompassed by the invention include $FeCl_3$, $AlCl_3$, $ZnCl_2$, $NaBr$, $KBr$, $NH_4Br$, $CsBr$, $BaBr_2$, $MgBr_2$, $CaBr_2$, $SrBr_2$, $FeBr_3$, $AlBr_3$, $ZnBr_2$, $Ba(NO_3)_2$, $Fe(NO_3)_3$, $NaNO_3$, $KNO_3$, $NH_4NO_3$, $FePO_4$, $MgCO_3$, $BaCa_3$, $Fe_2(SO_4)_3$ and the like.

B-1459 in a brine at at an elevated tempearture undergoes a decrease in pH value unless preventative measures are provided. Such decrease in pH value results in irremedial impairment to the fluid loss control properties of the B-1459 admixed therewith. Among changes effectuated therein by the reduced pH value is the degradation of the polymer as a result of which its fluid loss control properties are substantially destroyed.

Previous efforts to control the decrease in pH value of brine systems contaning a fluid loss control agent of the nature of B-1459 have not been fully successful. The employment of such additives as KOH or NaOH under normal field operations have resulted in some cross-linking of the B-1459 which has rendered the composition containing it unsuitable for its intended use. Attempts to regulate the amount of KOH or NaOH so as to prevent undesirable cross-linking has been found impractical in field operations.

However, when $Mg(OH)_2$ is employed in accordance with the invention, in an amount of at least about 10% by weight of the B-1459 employed (as aforestated), the pH value of the brine–B-1459 composition does not fall appreciably below about 8 and does not rise appreciably above about 9.2 and remains at that value for protracted periods of time thereafter even at high temperatures as will be shown in the examples set out hereinafter. The amount of $Mg(OH)_2$ to employ beyond the amount above stated is not highly critical so long as the resulting composition is flowable or pumpable. Greater amounts than the minimum above suggested are preferred. Such greater amounts do not cause the pH to rise higher than that desired. When an excess $Mg(OH)_2$ over and above that which will dissolve in the brine, and thereby produce a slurry, are employed according to one embodiment of the invention, such excess of $Mg(OH)_2$, remaining undissolved in the brine, system, desirably supplements the fluid loss control properties of the B–1459. When such excess or undissolved $Mg(OH)_2$ is lodged in the pores of a formation it serves in a highly acceptable manner as a supplemental fluid loss control agent which may thereafter be desirably removed by water, thereby leaving the pores open for the free passage of such fluids as oil therethrough.

Although the B–1459 in the presence of $Mg(OH)_2$ in a brine is fully satisfactory to inhibit fluid loss, such pulverulent materials as starch, natural gums, silica flour, $CaCO_3$, or selected powdered synthetic resins, e.g. polyacrylamide, polyvinyltoluene, polystyrene, and polypyrolidone, may be employed with the B–1459, to lessen the amount thereof needed, without objectionable lessening of the beneficial effects. Among the more common supplemental materials to employ with the B–1459 are starches obtained from any common source, e.g. grains, preferably of an average particle size between about 200 and 325 mesh although coarser and finer particle sizes are acceptable.

I have found that the B–1459 and $Mg(OH)_2$ in combination are markedly more effective in a brine which consists predominantly of $CaCl_2$ is aqueous solution and preferably of a relatively high concentration, e.g. that having a density of about 10 to 12 pounds per gallon. The mixing procedure in the preparation of the treating composition of the invention is not highly critical. The desired amounts of B–1459, with or without a starch, natural gum or the like, and $Mg(OH)_2$ may be added, independently or premixed, to a natural or an artificial brine. The preferred mixing procedure, however, is to premix dry B–1459 and dry $Mg(OH)_2$ with dry starch in an amount up to about 0.8 to about 1.2 times the weight of B–1459, then admix the thus prepared dry mixture with water, accompanied by stirring, and thereafter to add a sufficient amount of calcium chloride, either alone or supplemented by relatively minor amounts of other halides such as NaCl and $Zn(Cl)_2$, to the so treated water to give the desired high density liquid.

B–1459 is procurable from the United States Department of Agriculture, Agricultural Research Service, Northern Utilization Research and Development Division, Peoria, Illinois or by contacting the United States Department of Agriculture, Washington 25, D. C.

B–1459 is considered to have the molar ratio of mannose, glucose, glucuronate, and acetyl groups of 3:3:2:2, respectively, as determined by recent tests by the United States Department of Agriculture, although earlier work estimated the molar ratio of the mannose, glucose, glucuronate, and acetyl groups to be 2:2:1:1, respectively, as described in the publication identified as CA–N–9 of September 1959, entitled "Information on Polysaccharide B–1459," published by the United States Department of Agriculture, Agricultural Reseach Service, Northern Utilization Research and Development Division, Peoria, Ill.

B–1459 is normally a soft, bulky, slightly colored powder, having a molecular weight of about $1 \times 10^6$ and being anionic in nature. It has high resistance to bacterial action and remarkable stability, particularly in the presence of a polyvalent metal salt such as calcium chloride. It may be dissolved in water at room temperature or a higher temperature to produce a non-thixotropic fluid which shows a tendency to gelation. It has a pH value in the range of from about 7 to about 8.5 when in an aqueous concentration of from 0.1 to 1.0% by weight in the absence of any appreciable dissolved salt. It shows substantially no rotation of polarized light, i.e. it has a specific rotation of about zero.

B–1459 may be prepared in a water solution containing between 2.5 and 3 percent dextrose, 0.4 percent of a nitrogen source known as "distiller solubles," procurable from the major distilling industries by such identification, about 0.5 percent dipotassium phosphate, and about 0.01 percent Epsom salts, to which is admixed an innoculating bacterium known as Xanthomonas Campestris; a fermentation period is thereafter provided. The composition so prepared preferably has a potassium content of not more than 5.4 percent by weight and a chloride content sufficiently low to represent less than 0.3 percent KCl. The nitrogen content is preferably less than about 0.4 percent by weight and the phosphorus content is not more than 0.2 percent by weight.

In the preparation of B–1459 the pH of the solution is adjusted to 7. The solution is sterilized by heating it to about 275° F. for about three minutes. The solution is then cooled by passing it through a heat exchanger until a temperature of between about 80° and about 84° F. is obtained. The solution is then inoculated by adding a culture of the bacterium Xanthomonas Campestris in an amount of about 5 percent, by volume of the solution, to make a broth. The pH is maintained thereafter, by the addition of the dipotassium phosphate, at a value of between 6.2 and 6.7. Following inoculation with the bacterium, the broth is allowed to ferment for a total of about 96 hours. During this period the broth is agitated and aerated. Aeration is usually provided by admitting a stream of air at the bottom of the fermentation bath. After about 24 hours of the 96-hour period, a noticeable increase in viscosity is observed which continues to increase until a final viscosity of about 7000 centipoises (measured by the Brookfield viscosimeter) is reached at the end of 96 hours. The broth is then drum-dried. It contains about 50 percent of the active polysaccharide, i.e. B–1459, above described. The remaining 50 percent consists mainly of soluble sugars and insoluble cell walls which have no deleterious effect on the composition for use in the practice of the invention.

Additional information on the nature and properties of B–1459 may be obtained by referring to the aforementioned publication CA–N–9 of the United States Department of Agriculture or the Journal of Applied Polymer Science, volume V, issuse 7, pages 519–526 (1961) entitled "Polysaccharide B–1495; A New Hydrocolloid Polyelectrolyte Produced from Glucose from Bacterial Fermentation" by Jeanes, Pittsley, and Senti of the United States Department of Agriculture.

Additional information may also be obtained from licensed manufacturers of Polysaccharide B–1459, e.g. Archer-Daniels-Midland Company, 733 Marquette Avenue, Minneapolis, Minn., which has such information available under ADM Technical Data Publication, e.g. that identified as No. B–8, entitled "ADM Experimental Product 7097," dated July 18, 1962.

Comparative tests and examples illustrative of the practice of the invention, identified as series one to six hereinafter, were made to demonstrate the efficacy of the invention.

*Series one*

In this series, run for comparative purposes and not to demonstrate the invention, either 1 or 2 pounds of B–1459 were dispersed per 42-gallon barrel of either NaCl brine having a density of 10 pounds per gallon or a mixed brine of NaCl and $Na_2CO_3$ (in a ratio of about 87 pounds NaCl to 52 pounds of $Na_2CO_3$) per barrel of brine having a density of 10.5 pounds per gallon. The fluid loss was ascertained on the freshly prepared compositions. The compositions so made were caused to stand for a measured time at an elevated temperature and thereafter tested for fluid loss. In carrying out the tests, the B–1459 was admixed as a dry powder, by the aid of a spatula as a stirring device, into fresh water and sufficient technical grade NaCl and Na₂CO₃ (when employed) admixed therewith to give the stated density; B-1459 is readily dispersible at room temperature employing any conventional stirring technique.

The freshly prepared test compositions, after reserving a portion for obtaining fluid loss, were placed in stainless steel bottles which were sealed and stored in an oven at the desired temperature without agitation at a controlled temperature for the desired time.

The fluid loss tests were run at 200° F. and 500 p.s.i. according to API RP39, section V, using two thicknesses of No. 50 Whatman filter paper. The fluid loss is expressed as the number of milliliters (ml.) of fluid through the paper during a measured time in minutes. The concentrations, temperature, period of standing, and fluid loss before and after standing are shown in Table I, which follows.

TABLE I.—STABILITY OF B-1459 IN BRINE
[A. Brine was NaCl solution having a density of 10 lbs./gal.]

| Elapsed time | Temperature in ° F. while standing | Concentration of B-1459 in lbs./bbl. of brine | Fluid loss according to API RP39 in ml. at 200° F. and 500 p.s.i., after number of minutes shown | | | | |
|---|---|---|---|---|---|---|---|
| | | | 1 | 4 | 9 | 16 | 25 |
| None | 80 | 1 | 13.5 | 16.9 | 20.3 | 24 | 27.5 |
| 7 days | 250 | 1 | 41 | 48 | 56 | 60 | 68 |
| Do | 275 | 1 | 46 | 52 | 56 | 60 | 64 |
| None | 80 | 2 | 7.8 | 10.2 | 12.8 | 15.2 | 18.3 |
| 7 days | 250 | 2 | 15 | 17 | 19 | 22 | 25 |
| Do | 275 | 2 | 16 | 19 | 21 | 24 | 27 |
| 14 days | 250 | 2 | 28 | 44 | 60 | 65 | 72 |
| Do | 275 | 2 | 27 | 30 | 33 | 37 | 39 |

[B. Brine had a density of 10.5 pounds per gallon and consisted of 19.4 NaCl and 11.8% Na₂CO₃ by weight of solution]

| None | 80 | 2 | 18 | 19.5 | 22.5 | 25 | 28.6 |
|---|---|---|---|---|---|---|---|
| 7 days | 250 | 2 | 71 | 78 | 83 | 87 | 91 |
| Do | 275 | 2 | 53 | 73 | 85 | 88 | 94 |
| 14 days | 275 | 2 | Gum decomposed; solution heterogeneous | | | | |

Reference to Table I shows that B-1459 in the brines markedly reduces the fluid loss, when tested promptly, but that after more than about 7 days at an elevated temperature, the fluid loss control properties of the B-1459 are seriously impaired.

*Series two*

This series of tests, run also for comparative purposes and not to demonstrate the practice of the invention, was conducted according to the same procedure as series one, except that CaCl₂ brine having a density of 11 pounds per gallon was employed.

Reference to Table II shows that the effect of B-1459 alone, in a CaCl₂ brine although good when first prepared is also lessened upon standing at an elevated temperature.

*Series three*

This series of tests was run in accordance with the invention and is illustrative thereof. Two dry blends (designated A and B) of B-1459, commercial starch, and Mg(OH)₂ were prepared, employing, by weight, 40% B-1459, 40% starch, and 20% Mg(OH)₂ in part A and 60% B-1459, 30% starch, and 10% Mg(OH)₂ in part B. The dry blends so prepared were admixed with water and thereafter sufficient CaCl₂ admixed therewith to make compositions containing 1 pound of each of the blends per 42-gallon barrel of 11 pound/gallon density brine. The procedure followed was otherwise the same as in series one.

TABLE III.—STABILITY OF B-1459 IN BRINE CONTAINING Mg(OH)₂

[A. Blend of components: 40% B-1459, 40% Starch, and 20% Mg(OH)₂; Calcium chloride brine: having a density of 11.0 lbs./gallon; amount of blend used: 1 pound/barrel of brine]

| Temperature in ° F. during elapsed time | pH | Fluid loss according to API RP39 in ml. at 200° F. and 500 p.s.i. after number of minutes shown | | | | |
|---|---|---|---|---|---|---|
| | | 1 | 4 | 9 | 16 | 25 |
| No elapsed time | 9.0 | 15 | 15 | 18 | 19 | 22 |
| 250 for 48 hrs | 8.8 | 13 | 15 | 18 | 21 | 24 |
| 250 for 96 hrs | 8.8 | 10 | 15 | 19 | 23 | 27 |
| 250 for 168 hrs | 8.4 | 16 | 18 | 21 | 24 | 27 |
| 250 for 288 hrs | 8.6 | 8 | 10 | 13 | 16 | 19 |

[B. Blend of components: 60% B-1459, 30% starch, and 10% Mg(OH)₂; calcium chloride brine: having a density of 11.0 lbs./gallon; amount of blend used: 1 pound/barrel of brine]

| No elapsed time | 9.0 | 10 | 12 | 16 | 17 | 21 |
|---|---|---|---|---|---|---|
| 250 for 48 hrs | 8.8 | 16 | 18 | 21 | 23 | 26 |
| 250 for 168 hrs | 8.7 | 17 | 20 | 23 | 27 | 30 |
| 250 for 288 hrs | 8.6 | 6 | 7 | 9 | 10 | 12 |

Reference to Table III shows that the presence of Mg(OH)₂ is highly beneficial in stabilizing the brine composition containing B-1459 at a relatively constant pH value and prevented deterioration of the B-1459.

*Series four*

This series of runs further illustrate the practice of the invention. This series show the effect of varying the ratio of B-1459, starch and Mg(OH)₂ in a brine, within the limits of the invention. Separate blends were prepared employing sufficient B-1459, starch, and Mg(OH)₂ to provide the fractional pound of each ingredient, per 42-gallon barrel of an 11 pound/gallon density CaCl₂ brine, set out in Table IV. The pH values, viscosities employing a Fann viscosimeter (at 80° F. and at 100 r.p.m.) and fluid loss according to API RP39, Section V, were run on each sample.

TABLE II
[Calcium chloride brine: having a density of 11.0 pounds per gallon.]

| Elapsed time | Temperature in °F. while standing | Concentration of B-1459 in lbs./bbl. of brine | pH value | Fluid loss according to API RP39 in ml. at 200° F. and 500 p.s.i. after number of minutes shown | | | | |
|---|---|---|---|---|---|---|---|---|
| | | | | 1 | 4 | 9 | 16 | 25 |
| None | 80 | 1 | 8.3 | 9.5 | 11.8 | 13.3 | 15.2 | 17.4 |
| 7 days | 275 | 1 | 5.3 | 28 | 31 | 34 | 37 | 41 |
| None | 80 | 2 | 5.6 | 2.0 | 3.8 | 6.0 | 7.6 | 10.0 |
| 7 days | 275 | 2 | 4.4 | 5 | 8 | 10 | 13 | 15 |
| 14 days | 275 | 2 | | 31 | 45 | 60 | 69 | 77 |

TABLE IV.—EVALUATION OF FRESHLY PREPARED VARIOUS BLENDS OF B-1459, STARCH, AND MAGNESIUM HYDROXIDE
[Calcium chloride brine system: having a density of 11.0 lbs./gallon]

| Amount of Each Component (lbs./bbl.) | | | pH Value | Viscosity at 80° F. (Fann at 100 r.p.m.) | Fluid loss According to API RP10 in ml. at 250° F. and 500 p.s.i. after number of min. shown | | | | |
|---|---|---|---|---|---|---|---|---|---|
| B-1459 | J107 | Mg(OH)$_2$ | | | 1 | 4 | 9 | 16 | 25 |
| 0.25 | 0.25 | 0.125 | 9.2 | 7.8 | 16 | 19 | 21 | 24 | 28 |
| 0.25 | 0.25 | 0.375 | 9.2 | 8.4 | 33 | 27 | 30 | 34 | 38 |
| 0.25 | 0.75 | 0.125 | 9.3 | 8.4 | 19 | 23 | 25 | 28 | 30 |
| 0.25 | 0.75 | 0.375 | 9.3 | 9.0 | 14 | 17 | 19 | 20 | 23 |
| 0.75 | 0.25 | 0.125 | 9.2 | 13.2 | 5 | 6 | 8 | 11 | 14 |
| 0.75 | 0.25 | 0.375 | 9.1 | 15.0 | 4 | 6 | 8 | 10 | 14 |
| 0.75 | 0.75 | 0.125 | 9.1 | 14.4 | 8 | 9 | 11 | 13 | 16 |
| 0.75 | 0.75 | 0.375 | 9.0 | 17.4 | 5 | 7 | 9 | 11 | 14 |
| 0.40 | 0.40 | 0.20 | 9.0 | (*) | 13 | 15 | 18 | 19 | 22 |
| 0.50 | 0.34 | 0.16 | 9.0 | (*) | 10 | 12 | 15 | 17 | 20 |
| 0.60 | 0.30 | 0.10 | 9.0 | (*) | 10 | 12 | 16 | 17 | 21 |
| 0.65 | 0.25 | 0.10 | 9.0 | (*) | 9 | 11 | 13 | 15 | 18 |

*Not determined.

Reference to Table IV shows that the pH values are substantially unaffected by the variations in B-1459, starch, and/or Mg(OH)$_2$ within the limits of the invention. It further shows that the viscosity increases at increased additions of B-1459 or starch. Particularly it shows that the fluid loss of the brine desirably decreases with increases in either or both the B-1459 and Mg(OH)$_2$.

*Series five*

This series of runs also further illustrates the practice of the invention. It was made to show the efficacy of B-1459 and Mg(OH)$_2$ in CaCl$_2$ brine to reduce fluid loss in the absence of starch.

TABLE V.—INFLUENCE OF pH ON TEMPERATURE STABILITY OF B-1459—BRINE SYSTEMS
[Calcium chloride brine system: having a density of 11.0 pound/gallon]

| Elapsed Time and Temperature | In Pounds per Barrel of Brine | | pH Value | Viscosity at 80° F. (Fann at 100 r.p.m.) | Fluid loss according to API RP39 in ml. at 200° F. and 500 p.s.i. for number of minutes shown | | | | |
|---|---|---|---|---|---|---|---|---|---|
| | Amount of B-1459 | Amount of Mg(OH)$_2$ | | | 1 | 4 | 9 | 16 | 25 |
| None | 1 | None | 8.0 | 20.4 | 5 | 6 | 8 | 10 | 13 |
| 250° F. for 144 hrs | 1 | None | 5.3 | 7.2 | 21 | 24 | 28 | 32 | 37 |
| As prepared | 1 | 0.5 | 8.3 | 24.0 | 7 | 9 | 11 | 15 | 18 |
| 250° F. for 144 hrs | 1 | 0.5 | 8.7 | 8.4 | 8 | 9 | 12 | 14 | 18 |
| None | 2 | None | 5.6 | 64.8 | 5 | 7 | 10 | 12 | 16 |
| 250° F. for 144 hrs | 2 | None | 4.4 | 8.4 | Poor control (150 ml. in 16 minutes) | | | | |
| As prepared | 2 | 0.5 | 8.3 | 52.2 | 2 | 3 | 5 | 7 | 9 |
| 250° F. for 144 hrs | 2 | 0.5 | 8.7 | 24.0 | 3 | 5 | 7 | 8 | 11 |

Reference to Table V shows that the pH value drops noticeably at elevated temperatures when no Mg(OH)$_2$ is present with the B-1459. It also shows that the fluid loss is erratic after the brine system stands at an elevated temperature unless Mg(OH)$_2$ is present with the B-1459. It also shows that the results employing B-1459 and Mg(OH)$_2$ are fully satisfactory without the presence of the starch.

*Series six*

This series was run to show the effect of using excess Mg(OH)$_2$. The procedure followed was substantially that of series two except that additional Mg(OH)$_2$ was added as shown in Table VI. Fluid loss values are also shown in Table VI.

TABLE VI.—EVALUATION OF MAGNESIUM HYDROXIDE AS AN AID TO FLUID LOSS CONTROL
[Basic blend: 40% B-1459, 40% starch, and 20% magnesium hydroxide by weight; calcium chloride brine system: having a density of 11.0 lbs./gallon]

| Pounds of blend per barrel of brine | Additional pounds of Mg(OH)$_2$ per barrel of brine | Fluid loss according to API RP39 in ml. at 200° F. and 500 p.s.i. in number of minutes shown | | | | |
|---|---|---|---|---|---|---|
| | | 1 | 4 | 9 | 16 | 25 |
| 1 | 0 | 13 | 15 | 18 | 19 | 22 |
| 1 | 0.5 | 8 | 9 | 11 | 12 | 14 |
| 2 | 0 | 6 | 7 | 8 | 10 | 11 |
| 2 | 0.5 | 4 | 5 | 6 | 8 | 9 |

Reference to Table VI shows that additional Mg(OH)$_2$ further lessens the fluid loss of brine with which it is admixed.

*Series seven*

This series, run for comparative purposes, is not illustrative of the practice of the invention. It was run to show the results obtained when using other agents in lieu of Mg(OH)$_2$. Experiments were performed wherein a reasonable amount of base (either NaOH equivalent to 0.69 pound per barrel or KOH equivalent to 0.965 pound per barrel, which is calculated to give the same amount of OH$^-$ ions in solution as 0.5 pound per barrel of Mg(OH)$_2$) was added to a CaCl$_2$ brine, having a density of 11.0 pound per gallon, thickened with the B-1459 as set forth in this invention. Upon the addition of either base (as a solid) a precipitate formed immediately around each particle of base added. This precipitate prevented the solid particles from completely going into solution, and thereby prevented utilization of the total basicity of the added material and also prevented the fluid from being a homogeneous mixture. A related experiment was performed in which a 1 N (normal) solution of each base, viz. NaOH and KOH, were added separately in different experiments in an amount equivalent to 0.69 pound per barrel of NaOH and 0.965 pound per barrel of KOH. Again a precipitate was observed to form as the basic solution was added dropwise into the CaCl$_2$ brine containing B-1459. This series shows that the employment of such additives as KOH or NaOH under normal field operations is extremely difficult and can result in the formation of heterogeneous fluids. When the experiments of this series were repeated employing Ca(OH)$_2$ as a base, again unsatisfactory results were obtained. It appears to be necessary for the practice of this invention to have present a "reserve basicity," which will serve as a buffer to neutralize the acidic products formed by high temperature degradation of the gum. It is also desirable for this basicity to be reasonably well dispersed throughout the system.

A review of the examples and tables shows that when B-1459 is admixed with a brine, preferably CaCl$_2$, in the presence of $Mg(OH)_2$, the fluid loss of the so treated brine is very markedly reduced and that such reduction in fluid loss continues even though the so treated brine is stored for long periods of time at high temperatures. They further show that an excess of $Mg(OH)_2$ over that which will dissolve in the brine further improves the fluid loss properties of the so treated brine. They also show that attempts to stabilize a brine containing B-1459 by other than the use of $Mg(OH)_2$ are unsatisfactory. They also show that the B-1459 may be supplemented by such other known fluid loss additives as pulverulent silica (sometimes called silica flour), starch, or the like so long as the B-1459 is present in an amount of at least about two-thirds of the weight of the supplemental material.

Having described my invention what I claim and desire to protect by Letters Patent is:

1. The flowable composition of matter comprising Polysaccharide B-1459, $Mg(OH)_2$, a water-soluble inorganic salt, and water in an amount of each, by weight, of between about 0.015 and about 1.5 parts of polysaccharide B-1459, at least about 10% by weight of the $Mg(OH)_2$ based on the weight of the polysaccharide B-1459 employed, and the salt and water in a proportion of each of the salt and water to make a brine of the salt and water having a specific gravity of at least about 1.005, and in a total amount of both the salt and water to make 100 parts by weight of said composition.

2. The composition of claim 1 wherein the inorganic salts employed are metal halides.

3. The composition of claim 1 wherein there is present therein, pulverulent material selected from the class consisting of starch, natural gums, mineral material, and polyacrylamide in a proportion up to about one and a half times the weight of polysaccharide B-1459 present.

4. The composition of claim 1 wherein the $Mg(OH)_2$ is present in an amount in excess of that which will dissolve therein to produce a flowable $Mg(OH)_2$ slurry.

5. The composition according to claim 1 wherein the $Mg(OH)_2$ is present in an amount of at least about 0.0015 part per 100 parts by weight of said composition.

6. The composition of claim 5 wherein the metal halide is predominantly $CaCl_2$.

7. The method of treating a porous subterranean formation which comprises injecting down a well penetrating the formation and into contact therewith a flowable aqueous composition comprising by weight polysaccharide B-1459 in an amount of between about 0.015 and 1.5 parts, $Mg(OH)_2$ in an amount of at least about 10% by weight of the polysaccharide B-1459 employed, and sufficient water-soluble inorganic salt and water in a proportion of each to make a brine of the salt and water having a specific gravity of at least about 1.005 and a total amount of both to make 100 parts by weight of said composition and injecting the composition so made down the well and into contact with the formation.

8. The method of reducing loss of an aqueous fluid to an earth formation when in contact therewith which comprises admixing with said fluid prior to contacting the formation, by weight, polysaccharide B-1459 in an amount of between about 0.015 and 1.5 parts, based on 100 parts of said fluid, and $Mg(OH)_2$ in an amount of at least about 10% by weight of the polysaccharide B-1459 employed, and sufficient water-soluble inorganic salt which, when admixed with an amount of water equal to that present in said aqueous fluid results in a brine having a specific gravity of at least about 1.005 to make a flowable composition and forcing the resulting composition into contact with the formation.

9. The method of drilling a well employing an aqueous drilling fluid which comprises admixing with the fluid between 0.015 and 1.5 parts of polysaccharide B-1459, $Mg(OH)_2$ in an amount of at least about 10% by weight of the polysaccharide B-1459 employed, and sufficient water-soluble inorganic salt which, when admixed with an amount of water equal to that present in said drilling fluid results in a brine having a specific gravity of at least about 1.005 to make a low-fluid loss drilling fluid, and circulating the thus prepared drilling fluid down a drill tubing, out through a drilling means, and back up the annulus between the tubing and the borehole while operating said drilling means at the bottom of the hole to continue downward penetration of the formation.

10. The method according to claim 9 wherein the $Mg(OH)_2$ is employed in an amount of at least about 0.5 pound per 42-gallon barrel of drilling fluid being circulated.

11. The method of fracturing a formation penetrated by a well which consists of injecting down the well and into the formation at fracturing pressures a flowable aqueous composition comprising between 0.015 and 1.5 parts by weight of polysaccharide B-1459, based on 100 parts of said aqueous composition, and at least about 10%, by weight of the polysaccharide B-1459 employed, of $Mg(OH)_2$, and sufficient water-soluble inorganic salt to result in a specific gravity of at least about 1.005 when dissolved in an amount of water equal to that present in said aqueous composition.

12. The method according to claim 11 wherein the $Mg(OH)_2$ is employed in an amount of at least about 0.5 pound per 42-gallon barrel of said aqueous composition.

13. The method of reducing loss to a porous formation of an aqueous fluid injected down a well penetrating the formation and into contact therewith comprising admixing with said fluid between 0.015 and 1.5 parts of polysaccharide B-1459 and at least 0.0015 part by weight of $Mg(OH)_2$ per 100 parts by weight of said fluid and sufficient water-soluble inorganic salt to result, when admixed with an amount of water, equal to that present in said fluid, in a brine having a specific gravity of at least about 1.005, and injecting the resulting composition down the well and into contact with the formation.

14. The method according to claim 13 wherein starch is admixed with said fluid in an amount up to about one and a half times the weight of the polysaccharide B-1459 present.

15. The method according to claim 14 wherein the fluid is prepared by premixing polysaccharide B-1459, $Mg(OH)_2$, and starch in the dry state, admixing the resulting dry mix so made with water to make an aqueous composition and thereafter admixing with the aqueous composition sufficient soluble salt to result, when admixed with the water present in a specific gravity of at least 1.005.

References Cited by the Examiner

UNITED STATES PATENTS

| | | | |
|---|---|---|---|
| 3,000,790 | 9/1961 | Jeanes et al. | 252—8.5 X |
| 3,153,450 | 10/1964 | Foster et al. | 166—42 |
| 3,198,268 | 8/1965 | Lindblom et al. | 166—42 X |
| 3,228,855 | 1/1965 | Cadmus et al. | 252—8.5 X |
| 3,251,768 | 5/1966 | Walker | 252—8.55 X |

CHARLES E. O'CONNELL, *Primary Examiner.*

S. J. NOVOSAD, *Assistant Examiner.*